United States Patent [19]

Scarborough

[11] 4,029,895

[45] June 14, 1977

[54] RE-ENTERABLE SPLICE CASE

[75] Inventor: Grover Harry Scarborough, Exton, Pa.

[73] Assignee: AMP Incorporated, Harrisburg, Pa.

[22] Filed: Oct. 12, 1976

[21] Appl. No.: 731,181

[52] U.S. Cl. .............................. 174/138 F; 29/450; 174/84 R; 285/45

[51] Int. Cl.² ........................................ H02G 15/18

[58] Field of Search ................ 174/10, 84 R, 84 S, 174/84 C, 135, 138 F; 29/235, 450, 451; 285/15, 18, 23, 45, 235, 236; 339/213 R, 213 T

[56] References Cited

UNITED STATES PATENTS

| | | |
|---|---|---|
| 2,883,220 | 4/1959 | Johnson ....................... 174/84 C X |
| 3,047,651 | 7/1962 | Hawkes ........................... 174/84 S |
| 3,274,330 | 9/1966 | Becker et al. ................... 174/84 R |
| 3,878,320 | 4/1975 | Mixon, Jr. et al. .......... 174/84 R X |

FOREIGN PATENTS OR APPLICATIONS

| | | | |
|---|---|---|---|
| 961,447 | 4/1957 | Germany ......................... 174/84 R |
| 217,347 | 6/1924 | United Kingdom .............. 174/84 S |

Primary Examiner—Laramie E. Askin
Attorney, Agent, or Firm—Allan B. Osborne

[57] ABSTRACT

The present invention provides a splice case for covering the spliced junction or area of two multiwire cables with the advantage of being able to re-enter the splice area without destroying the integrity or the reuseability of the splice case. The splice case includes a tubular cover of resilient elastomeric material over a generally rigid sleeve member and a pair of ribbons positioned therein between to provide a means for rolling the cover back onto the sleeve member.

3 Claims, 4 Drawing Figures

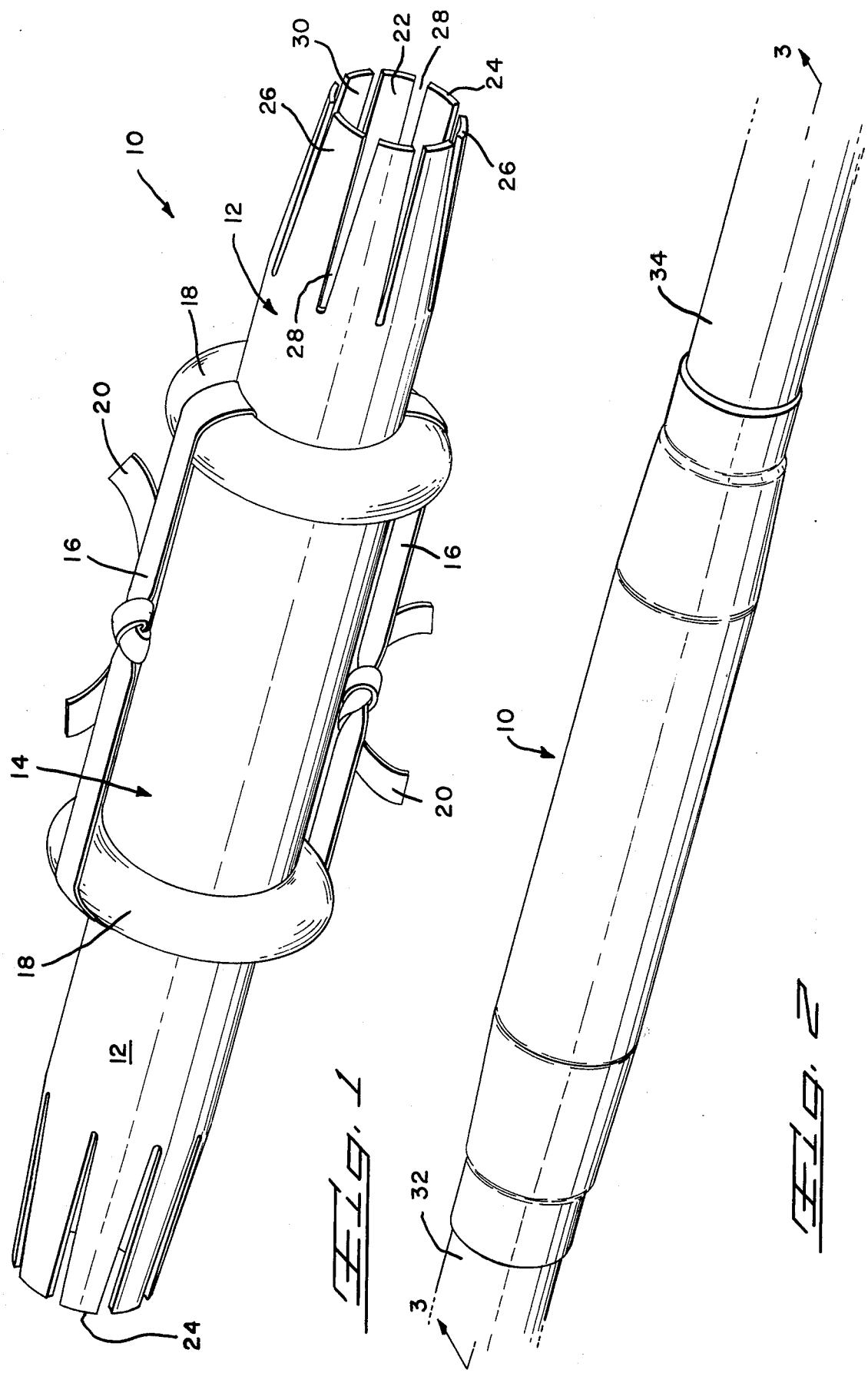

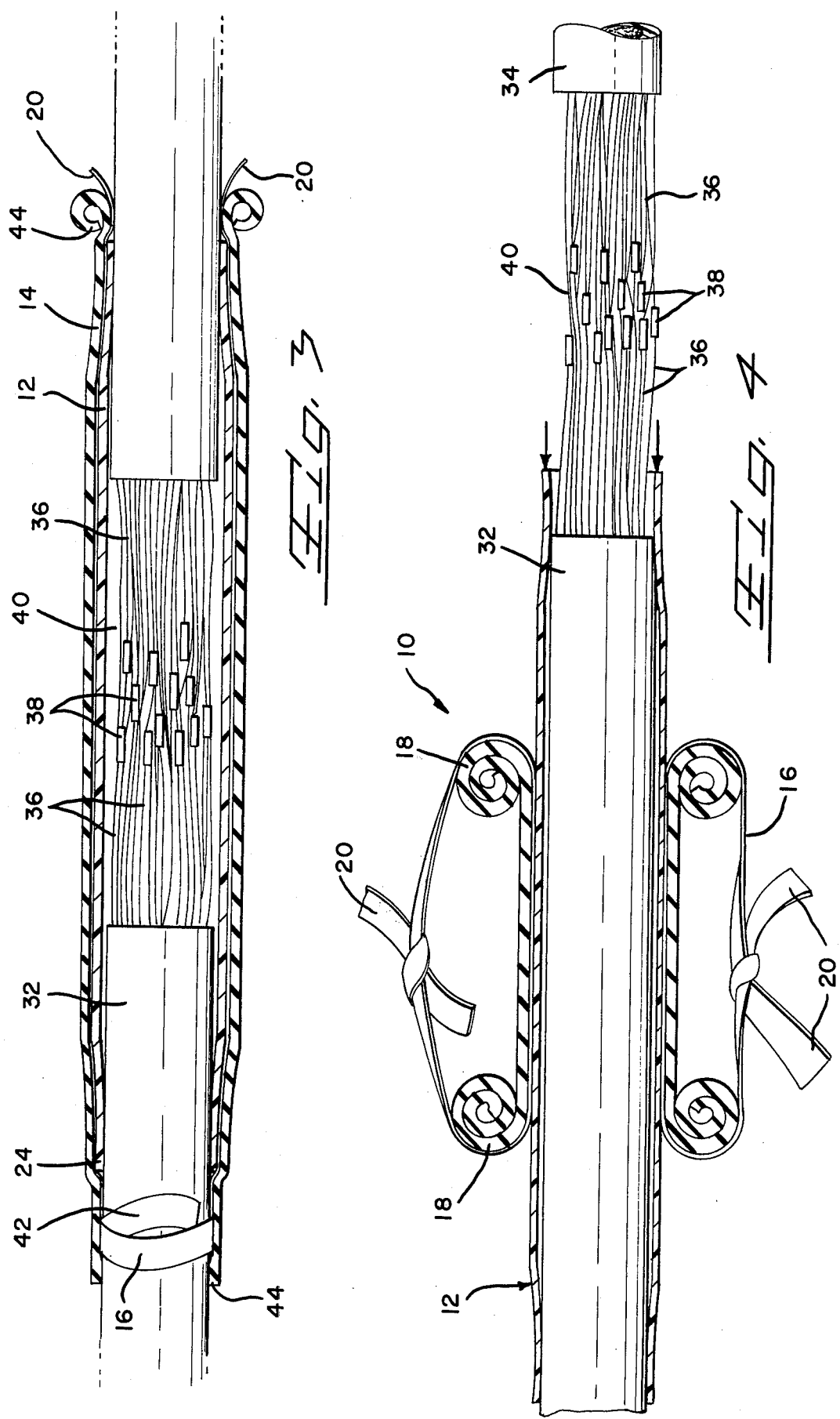

RE-ENTERABLE SPLICE CASE

BACKGROUND OF THE INVENTION

Cables containing many small diameter wires are used by telephone companies in their telephone network systems. The outer jackets of the cables are of a tough environmentally resilient material because of the nature of the surroundings in which the cables are located.

Not infrequently two cables must be joined; i.e., the many wires within spliced together. The splice area then must be protected against the hostile environment. Currently the only effective means for protecting the splice area is completely sealing it, usually with a case made from polyester resin and a hardening agent. However, this precludes re-entering the splice area without destroying the case; a task which is tough in an ideal location and almost an insurmountable one in an underground tunnel.

Elastomeric tubular covers are another means used to prodect a splice area. However, covers which possess the qualities required to withstand the hostile environment are of a too hgh durometer to be removed from the splice area without destroying them if re-entry is desired.

Accordingly it is an object of the present invention to provide a splice case which protects a splice area from hostile environmental agents and still permits re-entry into the area without destroying the elastomeric cover.

Another object of the present invention is to provide a splice case which is reuseable subsequent to a re-entry into the splice area.

BRIEF DESCRIPTION OF THE DRAWINGS

FIG. 1 is a perspective view of the present invention prior to its use;

FIG.2 is a perspective view of the present invention of FIG. 1 shown in place covering a splice area;

FIG. 3 is a cross-sectional view of the present invention taken along lines 3—3 of FIG. 2; and FIG. 4 is a cross-sectional view of the present invention slid back from the splice area.

DESCRIPTION OF THE PREFERRED EMBODIMENT

Splice case 10 as shown in the figures, includes four parts: a rigid tube or sleeve 12, a resilient cover 14 and two ribbons 16. FIG. 1 shows the parts assembled in a ready to use mode; i.e., cover 14 is centrally positioned on sleeve 12 with its ends 18 rolled up and with ribbons 16 positioned between the cover and sleeve. The ends 20 of the ribbons are tied together to keep the cover from being unrolled accidentally.

Sleeve 12 is an elongated sleeve made from a rigid plastic such as PVC. A bore 22 extends uninterrupted from one end 24 to the other. Both ends 24 are slit longitudinally to form a plurality of fingers 26. The slits 28 are generally V-shaped, being wide at the bores's opening 30 and narrowing inwardly as shown.

Cover 14 is preferably a polychloroprene having a hardness of about 45 durometer Shore A. Its inner diameter is somewhat smaller than the sleeve's outer diameter and its length is greater than the sleeve's length.

Ribbons 16 are made from any quality, tear resistant cloth and are longer than the cover. The width of each ribbon should be substantial so as to provide good gripping surfaces. Note that the ribbons are positioned diametrically in the assembly.

The emplacement of splice case 10 over a splice area will now be discussed with reference to FIGS. 1, 2 and 3.

Where two cables 32 and 34 (FIGS. 2 and 3) are to be joined, splice case 10, assembled as shown in FIG. 1, is slid back on one cable. The plurality of small diameter wires 36 (FIG. 3) are spliced together using insulated connectors 38, of the type such as made and sold by AMP Incorporated under the trademark PICABOND. Splice case 10 is then slid over the splice area, indicated generally by reference numeral 40 in FIG. 3, with sleeve 12 extending away therefrom equally on both sides. Upon untying ribbons 16, the ends are stretched out to just beyond the ends of sleeve 12 and wrapped around the cable as shown on the lefthand side of the drawing in FIG. 3 and generally indicated by reference numeral 42. The ends 18 of cover 14 are now unrolled the full length as shown in FIGS. 2 and 3. The slit ends 24 of sleeve 12 are squeezed or compressed down into a tight fit about cables 32 and 34. If desirous, a sealant (not shown) may be applied to the cable under the ends of cover 14 to provide a water-tight case. Alternatively hose clamps (not shown) may be used on the ends for the same reason. FIG. 2 illustrates splice case 10 in place about the splice area of two cables 32 and 34.

Re-entering splice area 40 is depicted in FIGS. 3 and 4. An end 44 of the cover 14 is rolled back by hand a distance sufficient to uncover ribbon ends 20. The durometer of the cover material does not permit very much more rolling. However, by grasping the two ribbon ends and pulling back on them, the cover end can be rolled up as shown in FIG. 4. After repeating the procedures for the other side of the cover, and typing the ribbon, the splice case 10 can be slid out to expose splice area 40.

It is apparent that the splice area can be recovered with splice case 10, re-entered, recovered and so on as many times as required without destroying the integrity or usefullness of the case.

The foregoing detailed description has been given for clearance of understanding only, and no unnecessary limitations should be understood therefrom, as some modifications will be obvious to those skilled in the art.

What is claimed is:

1. A splice case for removably covering a splice area between two cables, comprising:
    a. an elongated generally rigid sleeve adapted to be positioned over a splice area between two cables;
    b. an elongated resilient cover of elastomeric material supported on the sleeve and adapted to be rolled out over the sleeve and onto the cables extending out from either end of the sleeve; and
    c. a pair of ribbons of tear resistant material positioned diametrically between the sleeve and cover, said ribbons being adapted to roll up the ends of the cover by grasping the ribbon ends and pulling back toward the other end of the sleeve.

2. The splice case of claim 1 wherein the hardness of the cover is about 45 durometer Shore A.

3. The splice case of claim 1 wherein the sleeve ends are slit thereby permitting circumferentially compressing the ends down around the cables which may extend therethrough.

* * * * *